2,950,319

PURIFICATION OF AROMATIC META-DIAMINES

Leslie M. Schenck, Westfield, and Albert Bloom, Summit, N.J., assignors to General Aniline & Film Corporation, New York, N.Y., a corporation of Delaware No Drawing. Filed May 1, 1956, Ser. No. 581,830

1 Claim. (Cl. 260—582)

The invention here presented is a new process for the purification and preservation of the aromatic meta-diamines by a treatment with a surface active or ion exchange medium which effects a change in the character of the aromatic meta-diamines by which they are rendered much more stable and much more resistant to deterioration between the time of manufacture and the time of usage.

The aromatic meta-diamines are important intermediates in the manufacture of dyestuffs, pharmaceuticals, and the like, and are articles of commerce which are sold on a considerable scale for such usages. As freshly manufactured they are usually clear white or light brown crystals or powder, depending on the treatment, and of an excellent grade of purity. However, upon even a relatively short time of standing, a few days or weeks, a substantial deterioration occurs resulting in discoloration and a troublesome reduction in purity. The reasons for this deterioration are extremely obscure, and to the present no satisfactory means for improving storage stability has been found, and the custom is to use the material as soon as possible, or to disregard the impurities.

The aromatic meta-diamines practically always contain small amounts of the ortho and para forms which are not troublesome but are often regarded as unstable and the cause of the deterioration. In commercial manufacture there is no reasonably feasible procedure which will remove the ortho and para forms, and they are not ordinarily harmful or troublesome when present in small proportions in the meta compound. For long it was considered that these secondary components in the products manufactured were the primary cause of the deterioration of the m-diamine. However since the ortho and para forms are fully stable in their pure chemical state, it seems unlikely therefore that they are the primary cause of deterioration and accordingly it seems that the deterioration of the meta-diamine is due to the presence of some other by-product, present certainly in exceedingly small traces, which may perhaps act as a catalyst to set up some reaction leading to the deterioration; possibly even some reaction between the meta, ortho or para forms, or perhaps there is some catalytic substance which, in the presence of oxygen, speeds the deterioration. To the present it has not been possible to isolate any such traces of catalytic substance and whatever the reaction may be its character and cause are both wholly unknown.

According to the present invention it is now found that a treatment of the aromatic meta-diamines with their contained by-products, by a surface active absorbent, effects some change in the composition of the diamine material which outstandingly increases the storage stability. The reaction is entirely unknown but the storage stability is improved by several orders of magnitude.

Thus the process of the invention treats a commercial preparation consisting mainly of aromatic meta diamines with small amounts of ortho and para diamines known to be present. As an initial step to the purification, the amines are prepared in liquid form; that is, they may be dissolved in water or in a convenient organic solvent, or they may if desired be heated to a temperature above the melting point. In this liquid condition they are treated with absorbtive clays, or bauxite, or silica gels, or zeolites, or permutites, or the various charcoals and the like, which effect some unknown change in the composition of the materials which renders the meta diamine substantially fully stable to indefinite storage times without influencing their utility for the usual wide range of commercial reactions. Other objects and details of the invention will be apparent from the following description.

In practicing the invention; the aromatic meta diamines, in solution in water, or other solvent, or molten either as delivered from the manufacturing process, or redissolved in water for this treatment step; or dissolved in a hydrocarbon solvent, or as the crude molten amines are then brought into contact with the desired surface active material such as the clays or bauxite, silica gels, zeolites, permutities, various charcoals or the like in any desired manner such as by passage of the solution through an absorbent bed of the material or through a column of the material in a suitable container or by stirring the surface active substance into the solution and maintaining rapid stirring for a sufficient length of time to effect the desired change, then allowing the surface active material to settle and drawing off or filtering the treated solution. The surface active agent may then be reactivated by steam-stripping the surface active material, or by salt water treatment, or by any other convenient regeneration process and the aromatic meta diamines may be recovered by evaporation of the solution or by crystallization. Alternatively if the treatment is applied to the crude molten amines they need merely to be allowed to cool and crystallize; in which instance a partial crystallization may be utilized by slow cooling, a substantial portion of other impurities being retained in the residual molten material. This procedure results in an outstanding and very important increase in storage stability.

Example 1

300 g. of technical molten m-phenylenediamine is passed at the rate of about 100 g./hour through a 2" bed of silica gel supported in a 7/8" Pyrex tube at 120° C. The product thus obtained has increased stability upon storage. To accelerate the test, a sample at 70° C. is exposed at 6" distance from a 275 watt G.E. sunlamp for 16 hours together with an untreated control sample. The untreated sample turns black while the treated sample undergoes only a slightly perceptible discoloration.

Example 2

300 g. technical m-phenylenediamine in water solution is agitated one hour at 90–100° C. with 25 g. Permutit Q. Solids are removed by filtration, and the product flash distilled in vacuo to yield a light colored solid of outstanding stability upon storage either in the presence or absence of light.

Example 3

200 g. m-phenylenediamine Tech are dissolved in 500 g. benzene and refluxed 3 hours with 20 g. alumina. Upon isolation of the product by decantation from solids and distillation there is obtained a colorless solid of increased melting point which exhibits no color change upon prolonged exposure to ultra violet light.

It will be observed from these examples that the storage stability and the resistance to deterioration by light are outstandingly improved. However, it has not to the present been possible to say what change occurs in the aromatic meta diamines, whether the surface-active material absorbs traces of some substance which has a catalytic effect, or whether the surface-active phenomenon destroys an isomer of some sort.

While there are above disclosed but a limited number of embodiments of the process of the invention it is possible to provide still other embodiments without departing from the inventive concept herein disclosed, and it is therefore desired that only such limitations be imposed upon the appended claim as are stated therein or required by the prior art.

The invention claimed is:

Process for the prevention of discoloration of meta-phenylenediamine, which consists in the step of passing molten meta-phenylenediamine through a bed of silica gel at a temperature of 120° C., so as to effect the stabilization thereof whereby resistance to deterioration of the meta-phenylenediamine is improved and the tendency of the treated meta-phenylenediamine to remain colorless is increased.

References Cited in the file of this patent
UNITED STATES PATENTS

| | | |
|---|---|---|
| 2,365,493 | Richardson | Dec. 19, 1944 |
| 2,744,938 | Urban | May 8, 1956 |

OTHER REFERENCES

Brewster: "Organic Chemistry," second edition, page 580, Prentice Hall, New York (1953).